July 14, 1953 V. J. JUDSON 2,645,521
TRAILER COACH ROOF STRUCTURE
Filed April 15, 1949 2 Sheets-Sheet 1
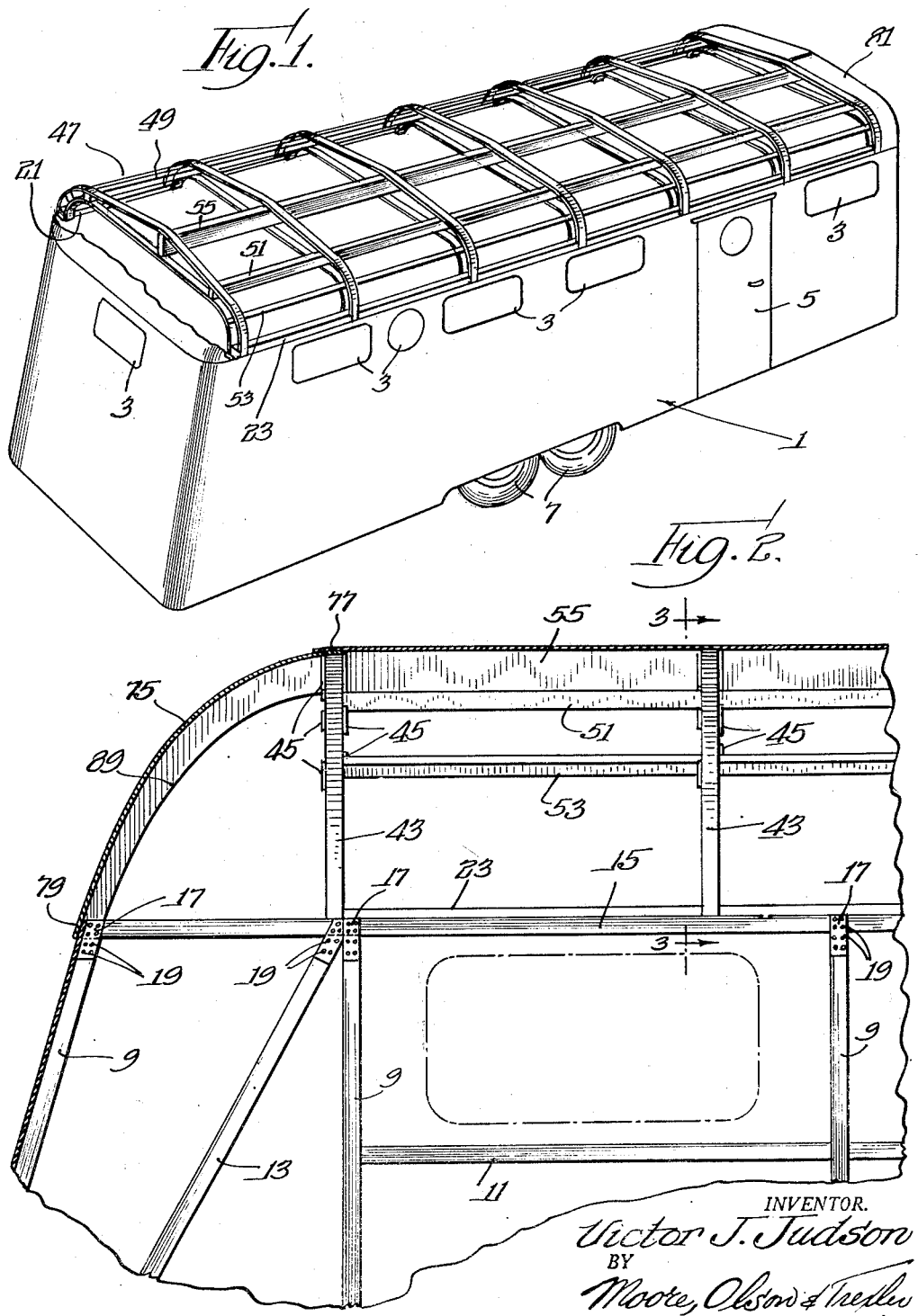
INVENTOR.
Victor J. Judson
BY
Moore, Olson & Trexler
Attys.

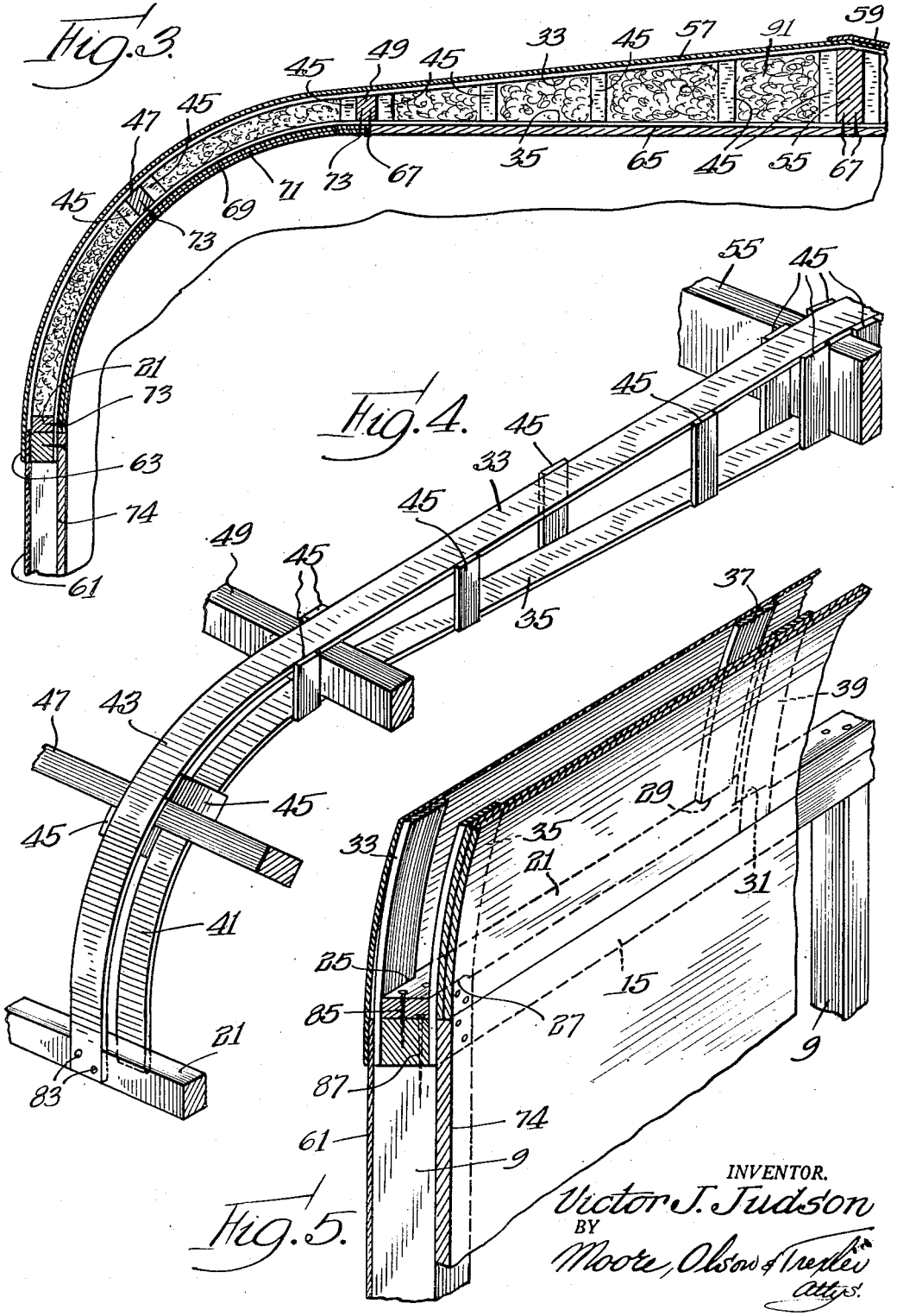

Patented July 14, 1953

2,645,521

UNITED STATES PATENT OFFICE 2,645,521

TRAILER COACH ROOF STRUCTURE

Victor J. Judson, Goshen, Ind.

Application April 15, 1949, Serial No. 87,821

6 Claims. (Cl. 296—137)

This invention is concerned with a trailer coach such as may be drawn behind an automobile or other vehicle, and is more particularly concerned with the roof construction of such a trailer.

To be satisfactory for towing behind automobiles at high speeds, trailers must be light in weight, yet strong. They must furthermore present a low center of gravity to resist being upset and must be durable, as they are constantly out in bad weather.

Previous to this time many trailers which have been generally satisfactory have had roof structures which have not met with unanimous satisfaction. Prior roofs that were sufficiently strong were generally too heavy. The roof structure being heavy caused the center of gravity of the entire trailer to be too high, thus leading to instability at high speeds or on roads that were not strictly level. A common roof construction has been of wood, and this has not been satisfactorily durable, quickly disintegrating under the elements. Other constructions have employed fabric tops and these have been not satisfactorily durable but also have oftentimes sagged so that water pockets were formed which had deleterious effects on the roof structure.

A primary object of this invention is to provide an improved trailer roof structure which is of light weight and consequently lowers the center of gravity of the trailer.

A further object of this invention is to provide such a light weight trailer roof structure which is strong and durable.

A still further object of this invention is to present a roof structure meeting the above requirements which is simple and economical to construct.

An ancillary object of this invention is to provide a trailer roof structure which can be assembled as a unit prior to installation on the trailer.

Still another object of the invention is to provide a trailer roof structure which provides and facilitates improved insulation and ventilation of the trailer interior.

Other and further objects and advantages of the current invention will be apparent from the following description when taken in conjunction with the accompanying drawings in which:

Fig. 1 is a perspective view of a trailer, incorporating the roof structure which is the subject of this invention and showing said roof structure with the covering removed;

Fig. 2 is a fragmentary elevational view of the upper rear part of the trailer and roof structure with the covering of the trailer and roof structure removed to the center line;

Fig. 3 is a partial sectional view taken substantially along the line 3—3 in Fig. 2;

Fig. 4 is a perspective view showing a roof sleeper and fragments of stringers to which it is secured; and Fig. 5 is a fragmentary perspective view partly in section showing the manner in which the roof structure is attached to the remainder of the trailer.

Referring more particularly to the drawings, the trailer coach 1, to which the roof structure which constitutes the current invention is attached, may be of any suitable construction. As is the general case, this trailer coach is provided with a suitable number of windows 3, a door 5 and wheels 7. The frame of the coach may include substantially vertical wooden support members 9. Other frame members 11 are preferably horizontally disposed, while still other frame members 13 are arranged in a substantially diagonal position for bracing purposes. The various frame members may be secured to each other and to an upper longitudinal wooden stringer 15 by means such as overlying plates 17 secured to the wooden members by screws 19 which pass through apertures in the plates and engage the wooden frame members. The entire frame is covered by an outer side wall of sheet aluminum 61. Sheet aluminum is used as it readily resists weathering and is extremely light weight. To prevent electrolytic action between the aluminum and a dissimilar metal, the plates 17 and screws 19, as well as the fastening members for attaching the covering to the frame are all made of aluminum.

The roof structure may be constructed as a separate unit and then installed on the coach. A pair of longitudinal wooden stringers 21 and 23, Fig. 1, run substantially the entire length of the coach and are recessed at spaced intervals as at 25, 27, 29 and 31, Fig. 5, to receive rib members such as 33, 35, 37 and 39 of aluminum strap. Each of the inner rib members such as 35 and 39 is substantially horizontal throughout its length but is bent into a semi-circular configuration at each end as at 41 in Fig. 4. Each outer or upper rib member is spaced a short distance outwardly and upwardly from each inner rib member and likewise presents a semi-circular configuration at each end as 43 in Fig. 4. Rather than being horizontal or flat, each of the outer rib members as 33 in Fig. 3 is angled near its center section to provide a peaked or gabled cross section for the roof. The inner and outer rib members are spaced from each other by aluminum straps 45 which are preferably welded to the inner and outer rib members at spaced intervals, alternate straps generally lying on opposite sides of the rib members.

Longitudinal stringers 47, 49, 51 and 53, Fig. 1, extend parallel to the longitudinal stringers 21 and 23, and are substantially the same length as the stringers 21 and 23. As is best seen in Figs. 3 and 4, these stringers which are placed at the curved part of the roof structure for additional strength are secured in position by adjacent straps 45, which are spaced substantially the width of the stringers and grip them to prevent relative movement of the stringers and the rib members.

A longitudinal ridge pole 55 extends substantially the length of the trailer and is also secured in position by adjacent straps 45, which are spaced a distance substantially equal to the width of the ridge pole and thus secure the ridge pole and rib members against relative movement.

The rib members and stringers are covered by a plurality of aluminum sheets 57 and 59 overlapping slightly at the center, as may best be seen in Fig. 3, and preferably secured at this point by welding. The lower longitudinal edge of the aluminum sheet extends below the stringers 21 and 23 so that it may overlap the trailer coach side covering of sheet aluminum 61, as best seen at 63 in Fig. 3. The upper section overlying the lower portion in this manner precludes any possibility of water entering the joint, which is made further water-proof by welding the sheets together. The sheet aluminum covering the roof structure may be secured to the outer rib members in any desired manner, but are preferably spot welded to make it unnecessary to pierce the sheet aluminum, which would lead to a shortened life of the structure and decreased water resistivity.

The inner section of the roof frame is covered by one or more panels of plywood 65, which may be secured to the longitudinal stringers 49 and 51 and the ridge pole 55 by nails or screws 67. The panel or panels of plywood 65 may be secured at each end by rivets or screws passing through the lower rib member. To prevent electrolytic action, these rivets or screws are made of aluminum. The inner curved portion of the ribs is preferably covered with a plurality of curved sections of plywood 69 and 71. Although it is possible to use only a single thickness of plywood for these sections, it is preferred to use a plurality of thinner sections which may be more readily bent. These sections are then secured as illustrated in Fig. 3 by nails or screws 73 which pass through the plywood into the stringers 21, 47 and 49. These plywood sections 69 and 71 extend just to the bottom edge of the longitudinal stringer 21 and lie flush with wallboard inner walls 74 of the trailer coach.

The rear section of the trailer roof is curved, as may best be seen in Fig. 2. As this section is rather small and there is little strain at this point of the coach, brace members are not provided. The roof is completed at the rear by a preformed aluminum cap 75 which at its top edge underlies the sheet aluminum coverings 57 and 59 to preclude the entrance of rainwater, and is preferably spot-welded thereto as at 77. The lower edge of the cap 75 overlies the external covering of the side and back of the trailer coach as at 79 and is preferably welded thereto. A substantially similar cap 81 is secured in a like manner to the leading edge of the roof structure, as may best be seen in Fig. 1.

The complete trailer coach may be manufactured as a separate entity before the roof is attached. The ribs as 33 and 35 may be attached to the lower longitudinal stringer as 21 by means of nails or screws 83, the sheet aluminum covering may be secured to the outside of the rib members, and the inner plywood panel 65 may be applied. To install the roof structure, it is then necessary only to set the roof structure in place with the longitudinal stringers 21 and 23 lying atop the horizontal frame members 15. These stringers may then be secured to the adjacent horizontal frame members by screws or nails 85. Nails 87 are shown passing through the longitudinal frame member 15 into the vertical frame members 9 to supplement the plates and screws 17 and 19. After the roof structure has been so secured in place, the curved panels 69 and 71 may be attached in their respective positions by means of the nails or screws 73 as previously described. The end caps 75 and 81 may be placed in position and all of the edges may be spot-welded as was stated earlier. For a more attractive internal appearance, preformed plywood caps 89, Fig. 2, may be secured to the inside of the inner rib members and longitudinal frame members 15 by means such as screws.

By using only aluminum nails and screws in conjunction with the aluminum rib members and sheet aluminum exterior and having all of the aluminum parts contacting no other material except wood, I have provided a construction in which there can be no electrolytic action between contacting dissimilar metals. The gable roof construction causes precipitation to flow off the roof as quickly as possible so that there will be less snow load atop the trailer in inclement weather. By having the edge overlap with the outside piece on top and presenting a smooth, rigid roof structure, I have eliminated any possibility of water pockets which would shorten the life of the roof structure.

It will be noted that the roof structure constituted as above described, provides a hollow space between the outer aluminum sheeting 57, 59 and the inner plywood walls 65, 69, 71 into which spun glass or other suitable, light weight, insulating and filtering material may be placed. Preferably ventilators and ventilation openings are provided on and through the outer aluminum sheeting, and ventilation openings are similarly provided at displaced points through the walls 65, 69, 71 into the trailer interior. In such event the spun glass or other insulation and filtering material permits the passage of air through the roof in a controlled manner, while at the same time providing a filtering action, and also providing insulation and minimizing the condensation of moisture on the roof parts. Such insulating material is illustrated at 91 in Fig. 3 but is omitted in the other figures of the drawings for clarity.

By constructing my trailer roof structure entirely of aluminum and wood with only the aluminum exposed to the elements, I have provided a roof structure which is strong and durable and yet is light in weight so that the center of gravity of the trailer coach may be as low as possible and the trailer may exhibit great stability.

While one form of the invention has been shown for purposes of illustration, it is to be clearly understood that various changes in the details of construction, arrangement of parts and relative shaping of the parts may be accomplished without departing from the scope of the invention as set forth in the appended claims.

The invention is hereby claimed as follows:

1. A roof structure comprising a plurality of longitudinal stringers, a plurality of sleepers arranged substantially transversely of said stringers, each of said sleepers comprising a pair of spaced apart ribs secured in spaced relation by a plurality of spacer members secured thereto at intervals, some of said spacer members being closely spaced and trapping a stringer between them, the ends of said ribs being downturned and some of said stringers being secured between corresponding rib ends, sheet material secured above and below said stringers and sleepers in juxtaposition thereto to provide a covering therefor, and a curved cap member of sheet material secured at each end of said roof structure to complete said roof structure.

2. A roof structure comprising a plurality of longitudinal stringers, a plurality of sleepers arranged substantially transversely of said stringers, each of said sleepers comprising a pair of spaced apart ribs secured in spaced relation by a plurality of spacer members secured thereto at intervals, the lowermost of each set of ribs being curved at each end for attaching to a trailer coach and substantially flat throughout the remainder for providing a flat ceiling, the uppermost of each of said ribs being curved at each end for attachment to a trailer coach and obtusely angled substantially at the center portion to provide a gabled roof section, corresponding ends of adjacent lowermost and uppermost ribs being secured to a stringer and spaced apart thereby, and sheet material secured above and below said stringers and sleepers in juxtaposition thereto to provide a covering therefor, the uppermost section of sheet material extending beyond said sleepers for overlying the side wall of a trailer coach.

3. A trailer roof structure of unitary construction comprising a plurality of longitudinal stringers, a plurality of sleepers arranged substantially transversely of said stringers and curved downwardly at each end, each of said sleepers comprising a pair of spaced apart ribs secured in spaced relation by a plurality of spacer members secured thereto at intervals, the ends of said ribs being curved downwardly, a stringer being secured substantially at the extremities of each of said sleepers and adapted to lie atop cooperating stringers at the upper edge of a trailer coach wall for attachment thereto, and a covering of sheet material secured above and below said stringers and sleepers in juxtaposition thereto.

4. A trailer coach roof structure of unitary construction comprising a plurality of wooden longitudinal stringers, a plurality of light weight metal sleepers arranged substantially transversely of said stringers, each of said sleepers comprising a pair of spaced apart light weight metal flat strap-like ribs secured in spaced relation by a plurality of flat strap-like spacer members of light weight metal secured at intervals thereto, some of said spacer members being spaced substantially the width of a stringer and securely gripping a stringer, all of said sleepers being curved downward at their extremities and some of the stringers being secured substantially at and between said extremities for cooperation with stringers lying atop the walls of a trailer coach, a pair of end caps of light weight metal at each end of said roof structure, light weight sheet metal secured above said stringers and sleepers in juxtaposition thereto, said sheet material overlapping said caps, and said sheet material and said caps extending below the bottom stringers for overlying the exterior surface of a trailer coach, and light weight sheet material secured below said stringers and sleepers and spaced from said exterior surface and providing a ceiling for a trailer coach.

5. A trailer coach roof structure comprising a plurality of longitudinal stringers, a plurality of sleepers arranged substantially transversely of said stringers, each of said sleepers comprising a pair of spaced apart flat ribs secured by spaced strap-like spacer members, said stringers extending between the ribs of said sleepers and secured on opposite sides by certain of said spacer members, and the ends of said sleepers being turned downwardly and terminally secured to edge stringers to adapt the roof structure for ready attachment as a unit to the top of a trailer coach wall.

6. A trailer coach roof structure as claimed in claim 5, wherein the ends of the sleepers are arched downwardly and with certain of said stringers extending between the sleeper ribs along the arched portions thereof and secured thereto by certain of said spacer members.

VICTOR J. JUDSON.

References Cited in the file of this patent

UNITED STATES PATENTS

| Number | Name | Date |
|---|---|---|
| 714,190 | Keller | Nov. 25, 1902 |
| 1,068,317 | Christy | July 22, 1913 |
| 1,096,462 | Russell | May 12, 1914 |
| 1,438,298 | Coleman et al. | Dec. 12, 1922 |
| 1,650,203 | Froesch | Nov. 22, 1927 |
| 1,703,118 | McCulley et al. | Feb. 26, 1929 |
| 1,765,639 | Tucker | June 24, 1930 |
| 2,059,866 | Hicks | Nov. 3, 1936 |
| 2,381,796 | Williams | Aug. 7, 1945 |
| 2,427,649 | Theriault | Sept. 16, 1947 |